April 18, 1939. K. N. DONALLY 2,154,670
SIGNALING DEVICE
Filed April 10, 1937
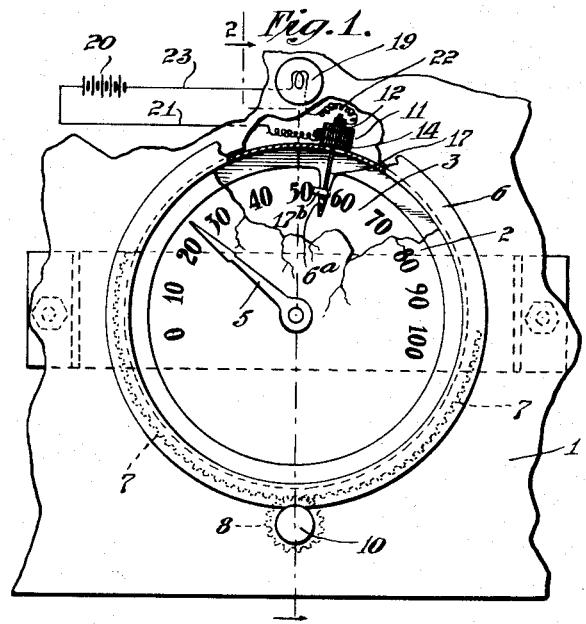
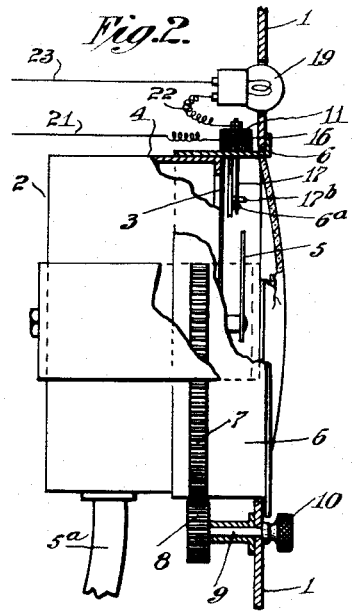
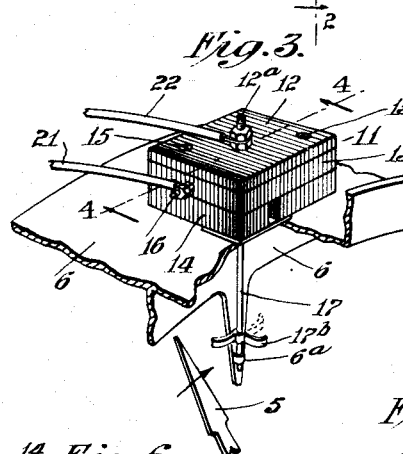
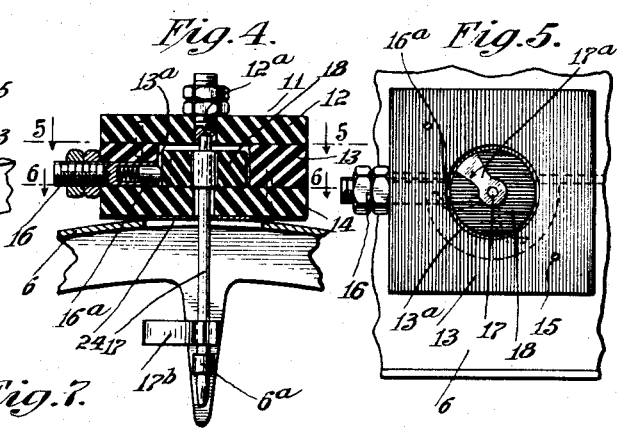
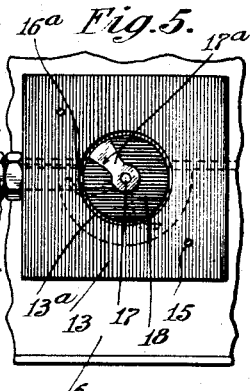
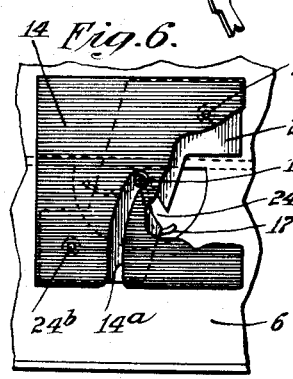
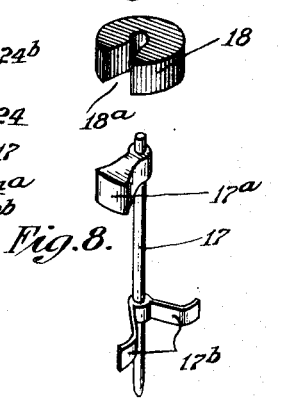
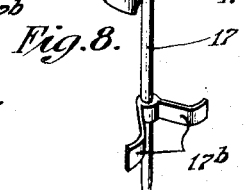
INVENTOR
Kingman N. Donally
BY
Redding, Greeley & O'Shea
ATTORNEYS Patented Apr. 18, 1939

2,154,670

UNITED STATES PATENT OFFICE 2,154,670

SIGNALING DEVICE

Kingman N. Donally, Bellerose, N. Y.

Application April 10, 1937, Serial No. 136,065

2 Claims. (Cl. 200—56)

This invention has been developed with particular reference to the provision of means whereby the driver of an automobile may be informed by the operation of a signal on the automobile when the speed of the automobile reaches a predetermined speed limit which is subject to change under different road conditions. In the embodiment of the invention chosen for illustration and explanation of the nature of the invention there is provided in a movable relation with respect to the scale, whether movable or stationary, of a speedometer, a switch or contact device which can be set on the scale at one point or another and is actuated by relative movement of the scale and a pointer so that through suitable electrical connections a signal either audible or visual is actuated for the purpose of warning the driver that the speed has reached or is approaching a predetermined limit. It will be understood, however, as this description proceeds, that the invention is susceptible of use for signaling other conditions than speed, as, for example, pressure in a boiler. It has been the object of the invention to provide a signaling device of the character referred to which is capable of ready application to speed or other indicators, such as automobile speedometers, pressure gauges and the like, without necessitating any rearrangement or reconstruction of the indicating mechanism. In the accompanying drawing the embodiment of the invention chosen for explanation comprises a movable carrier mounted on the rim of a dial speedometer and a switch mounted on the carrier so that it may be shifted to different points of the indicator scale and adapted to be actuated by the pointer in its movement so as to close an electric circuit through the signal which in this case is shown as an electric lamp. It will be understood, however, that the invention, as pointed out in the accompanying claims, is capable of expression in other embodiments than that now to be described.

In the drawing

Figure 1 is a view in front elevation of an ordinary dial speedometer mounted on the instrument board of an automobile and having the signaling device incorporated therewith, the glass front of the speedometer being broken away and part of the frame of the speedometer being shown in section.

Figure 2 is a view of the same in elevation and partly in section on the plane indicated by the broken line 2—2 of Figure 1 with parts broken away or removed to show other parts behind them.

Figure 3 is a view in perspective of the switch block mounted on the rim of the speedometer, the electrical connections, the spindle of the switch and a portion of the speedometer pointer being also shown.

Figure 4 is a view in sectional elevation on the plane indicated by the broken line 4—4 of Figure 3.

Figure 5 is a sectional plan view on the plane indicated by the broken line 5—5 of Figure 4, the top member of the switch block being removed.

Figure 6 is a sectional plan view on the plane indicated by the broken line 6—6 of Figure 6, the lower member of the switch being broken away to show the locking or bearing plate below it.

Figure 7 is a view in perspective of a supporting block of insulating material carried by the switch spindle; and Figure 8 is a view in perspective of the switch spindle with its contact member and the arms through which it is actuated by the speedometer pointer.

In the embodiment of the invention illustrated there is arranged on the instrument board, a portion of which is shown at 1 in Figure 1, a dial speedometer 2 of usual construction, having a dial 3 on which appear the speed indications from zero to 100, a circular frame 4, and a pointer 5 which may be actuated as usual from one of the automobile wheels through a cabled connection 5ᵃ.

On the frame 4 is mounted an annular carrier 6 which is provided with a gear 7 in engagement with a pinion 8 on a spindle 9 which is mounted in the frame of the speedometer and is provided with a thumb nut 10 so that the carrier can be given movement of rotation in one direction or the other on the speedometer frame.

Supported by the carrier is a switch block indicated generally at 11. For convenience in construction the switch block comprises three plates, 12, 13 and 14, of hard rubber or other suitable insulating material, secured together by screws 15. The middle plate 13 is chambered centrally, as at 13ᵃ, and it receives a conductor terminal 16 provided with a spring-pressed contact plunger 16ᵃ.

Mounted in a suitable bearing 12ᵃ, supported in the top plate 12 and in a bearing 6ᵃ supported by the carrier 6, is a switch spindle 17, preferably mounted in a plane parallel with the plane of the dial. Secured to the spindle near its upper end is a contact arm 17ᵃ and also mounted on the spindle is a block 18 of insulating material recessed, as at 18ª, to receive the contact arm 17ª. Also secured to the spindle 17ª, near its lower end, is a two-armed member 17ᵇ for coaction with the pointer 5 which in its movement in one direction, as from left to right in Figure 1, effects a partial rotation of the spindle 17 and places the contact arm 17ª in contact with the terminal 16, closing the circuit through the alarm, as will be described. In the movement of the pointer 5 in the opposite direction, when the speed has exceeded 60, for example, and then moves from right to left in Figure 1, the pointer engages the other arm 17ᵇ and causes the arm 17ª to be moved out of contact with the terminal 16, breaking the circuit through the alarm.

It will be understood that the spindle 17 and the terminal 16 constitute the two terminals of an electrical circuit which includes an alarm 19, shown here as an electric lamp, and a source of electrical energy, represented here as a battery 20. As represented here the circuit includes wires 21 and 22 connected respectively to the terminals 12ª, 17 and 16 and sufficiently slack to permit the shifting of the switch block from one point to another of the scale formed on the dial. The circuit is here shown as completed by a wire 23 from the lamp 19 to the battery 20, but it will be obvious that the circuit might be completed on one side or the other of the battery through some part of the supporting frame or mechanism or through a ground.

For convenience in construction and in the assembling of a three-part block of insulating material the bottom plate 14 may be formed with a slot 14ª and to provide a bearing for the spindle 17 and to prevent its displacement in the slot 14ª there is provided a locking plate 24 formed with a slot 24ª which may be slipped into place under the plate 14 of the insulating block with its slot 24ª in registration with the slot 14ª and then turned to place the slot 24ª out of registration with the slot 14ª, as shown in Figure 6, and secured in position by pins or screws 24ᵇ passed through the plate 24 into the insulating plate 14.

It will be understood that when the carrier has been shifted with respect to the scale to place the switch block 11 with its spindle 17 in registration with the predetermined speed indication, as 55 for example, and the speed, for example, is raised to 55, as indicated by the pointer 5, the pointer will cause such a partial rotation of the spindle 17 and the contact arm 17ª as to close the circuit between such arm and the terminal 16, and that thereupon the signal will be actuated to indicate to the driver, either by eye or ear, that the speed has reached the predetermined limit. So long as the speed is maintained at or over such predetermined limit the signal will continue to be actuated and when the speed falls below the predetermined limit the pointer will cause such partial rotation of the spindle 17 through contact with the other arm 17ᵇ as to break the circuit between the terminal 16 and the contact arm 17ª and the operation of the signal will be discontinued.

Whether the signal is audible or visual it will be evident that, the signal being either within the general vision of the driver or within his hearing, the driver will be warned that the limit of speed has been obtained and continues without requiring him to take his eyes from the road.

It will be obvious that various changes in details of construction and arrangement can be made without departing from the spirit of the invention and that the invention is not to be regarded as restricted, except as pointed out in the accompanying claims.

I claim as my invention:

1. A circuit controlling device consisting of a movable pointer, a movable carrier, a switch block mounted on the carrier and comprising three plates of insulating material, the middle plate being recessed, a conductor terminal mounted in the middle plate, a spindle, a recessed block of insulating material mounted on the spindle, a contact arm mounted on the spindle in the recess of the middle plate, and a two-armed member mounted on the spindle for coaction with the pointer.

2. A circuit controlling device consisting of a movable pointer, a movable carrier, a switch block mounted on the carrier and comprising three plates of insulating material, the middle plate being recessed, a conductor terminal mounted in the middle plate, a spindle, a recessed block of insulating material mounted on the spindle, a contact arm mounted on the spindle in the recess of the middle plate, and a member mounted on the spindle for coaction with the pointer, the bottom plate being slotted to receive the spindle and the middle plate being also slotted to receive the spindle.

KINGMAN N. DONALLY.